US012624760B2

(12) United States Patent
Delozier et al.

(10) Patent No.: US 12,624,760 B2
(45) Date of Patent: *May 12, 2026

(54) GAP COVER

(71) Applicants: Eli Delozier, Winchester, CA (US);
Daniel Clinton, Forestdale, MA (US)

(72) Inventors: Eli Delozier, Winchester, CA (US);
Daniel Clinton, Forestdale, MA (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/892,699

(22) Filed: Sep. 23, 2024

(65) Prior Publication Data

US 2025/0012360 A1     Jan. 9, 2025

Related U.S. Application Data

(63) Continuation-in-part of application No. 17/825,755,
filed on May 26, 2022, now Pat. No. 12,119,781.

(51) Int. Cl.
*F16J 15/06*     (2006.01)
*H02S 20/23*     (2014.01)
*E04H 6/02*     (2006.01)

(52) U.S. Cl.
CPC .............. *F16J 15/06* (2013.01); *H02S 20/23*
(2014.12); *E04H 6/025* (2013.01)

(58) Field of Classification Search
CPC ........... F16J 15/06; H02S 20/23; E04H 6/025
See application file for complete search history.

(56) References Cited

U.S. PATENT DOCUMENTS

| | | | | |
|---|---|---|---|---|
| 1,578,328 | A | 3/1926 | Lessing | |
| 3,002,253 | A | 10/1961 | Kessler | |
| 3,324,598 | A | 6/1967 | Tinfow | |
| 3,374,580 | A * | 3/1968 | Ruff | E06B 7/2318 |
| | | | | 49/470 |
| 3,836,421 | A | 9/1974 | Terry, Jr. | |
| 4,428,171 | A * | 1/1984 | Harbin | E04B 2/965 |
| | | | | 52/204.593 |
| 4,977,716 | A * | 12/1990 | Hawkins | E04D 3/08 |
| | | | | 52/235 |
| 5,356,675 | A | 10/1994 | Unger | |
| 5,735,035 | A | 4/1998 | Holt | |
| 6,735,912 | B2 * | 5/2004 | Riggio | E04D 3/08 |
| | | | | 52/235 |
| 6,772,561 | B1 | 8/2004 | Berger | |
| 8,881,464 | B1 * | 11/2014 | Huckeba | E06B 1/6046 |
| | | | | 49/489.1 |
| 9,181,692 | B1 * | 11/2015 | Callaway | E04F 19/024 |

(Continued)

FOREIGN PATENT DOCUMENTS

| | | |
|---|---|---|
| CN | 204060346 U | 12/2014 |
| CN | 207869032 U | 9/2018 |

(Continued)

*Primary Examiner* — Eugene G Byrd
(74) *Attorney, Agent, or Firm* — Lambert Shortell &
Connaughton; David J. Connaughton, Jr.; Justin P. Tinger

(57)     ABSTRACT

A gap sealing structure operable to create a water-resistant
seal of a gap between adjacent solar panels is provided. The
gap sealing structure has an elongate body which may fit in
the gap between adjacent solar panels. In operation, the gap
sealing structure may be useful to, among other applications,
prevent excess water leakage through a solar panel array
positioned over parking areas, seating areas, walkways, and
the like.

20 Claims, 9 Drawing Sheets

(56)  References Cited

U.S. PATENT DOCUMENTS

| | | | |
|---|---|---|---|
| 10,036,576 B1 * | 7/2018 | Robinson ............... | F24S 25/632 |
| 12,119,781 B2 * | 10/2024 | Delozier ................. | H02S 20/23 |
| 2002/0092224 A1 | 7/2002 | Hope | |
| 2005/0194751 A1 | 9/2005 | Fukushima | |
| 2007/0084504 A1 * | 4/2007 | Kobayashi ............ | F24S 25/615 |
| | | | 136/251 |
| 2009/0078377 A1 | 3/2009 | Ohara | |
| 2013/0220395 A1 * | 8/2013 | Babineau, Jr. .......... | F24S 25/35 |
| | | | 403/345 |
| 2015/0075587 A1 * | 3/2015 | Veloso .................... | H02S 30/10 |
| | | | 264/177.1 |
| 2015/0102194 A1 * | 4/2015 | Liu ........................ | F24S 25/636 |
| | | | 248/316.1 |
| 2015/0107168 A1 * | 4/2015 | Kobayashi .............. | H02S 20/23 |
| | | | 52/173.3 |
| 2019/0199271 A1 * | 6/2019 | Hood ...................... | H02S 20/23 |
| 2020/0385993 A1 * | 12/2020 | McDonald ............. | H02S 20/23 |
| 2020/0403562 A1 | 12/2020 | Wang | |
| 2021/0041144 A1 * | 2/2021 | Eriksson ................. | F24S 25/37 |
| 2025/0012360 A1 * | 1/2025 | Delozier ................. | F16B 7/187 |

FOREIGN PATENT DOCUMENTS

| | | | | |
|---|---|---|---|---|
| CN | 109433699 A | * | 3/2019 | ............... F16J 15/06 |
| JP | 2001-171441 A | | 6/2001 | |
| TW | 202017309 A | | 5/2020 | |

* cited by examiner

GAP COVER

BACKGROUND

Technical Field

The present disclosure relates generally to gap covers. More particularly the present disclosure relates to a gap cover, also referred to as a weather stripping, for gaps in solar panel installations.

Description of Related Art

Solar panel installations have rapidly expanded in recent years. Increasingly, solar panels are being installed for the dual use of both solar collection as well as a covering to provide shade and weather protection. Such installations are used for covering walkways, parking areas, and the like. However, the modular nature of solar panels cause them to be installed in panel units, with spacing inevitably between the different panels. This leads to substantial water, debris, and wind infiltration through the gaps between the panels which falls below onto the surfaces which are intended to be sheltered from the elements.

Therefore, what is needed is a device that may seal gaps between solar panels.

SUMMARY

The subject matter of this application may involve, in some cases, interrelated products, alternative solutions to a particular problem, and/or a plurality of different uses of a single system or article.

In one aspect, weather stripping is provided for fitting across gaps between solar panels. The weather stripping has an elongate body having a flange extending away from each lengthwise edge of the body. A gasket is attached to and extends downwardly away from a bottom surface of each flange. The weather stripping further has a bracket at a center bottom area of the body. This bracket is connectable to an anchor by, for example, a bolt. In a particular example, a bolt head may be engaged with the bracket and the distal threaded end of the bolt may be connected to the anchor by, for example, threading on the anchor or a nut holding anchor to the bolt.

In another aspect, a solar panel assembly is provided. The solar panel assembly has a plurality of solar panels attached to a support structure, with gaps between each adjacent of the plurality of solar panels. A weather stripping is positioned across the gaps. The weather stripping has an elongate body having a flange extending away from each lengthwise edge of the body. A gasket is attached to and extends downwardly away from a bottom surface of each flange. The weather stripping further has a bracket at a center bottom area of the body. This bracket is connected to an anchor which is engaged either directly or indirectly with the support structure, first solar panel, second adjacent solar panel, and combinations thereof. The weather stripping thus creates a water-resistant seal of the gap between the first solar panel and the second solar panel In yet another aspect, a method of sealing a gap between two solar panels is provided. The method involves positioning a weather stripping across the gap. As positioned, the weather stripping has a first flange positioned over a first of the two solar panels, and a second flange positioned over a second of the two solar panels. A gasket of the first flange contacts a top surface of the first of the two solar panels, and a second gasket of the second flange contacts a top surface of the second of the two solar panels. The method further involves positioning a bolt head into a bracket at a center of the body. As positioned, the bolt head is limited from movement in a direction parallel to a minor axis of the weather stripping but movable in a direction parallel to a major axis of the weather stripping. This allows the bolt head to pull the weather stripping and gaskets towards the top surface of the solar panel, while also allowing the bolt to slide along the bracket when tension is not being applied to it. The method further involves securing the bolt to an anchor plate at a distal end of the bolt, and tightening the bolt to the plate. The anchor plate engages with a back side of both of the two solar panels, and the tightening of the bolt to the plate thereby holding the weather stripping in place by urging the gasket and plate to the top and bottom surfaces, respectively, of each solar panel.

DETAILED DESCRIPTION

Figure 1:
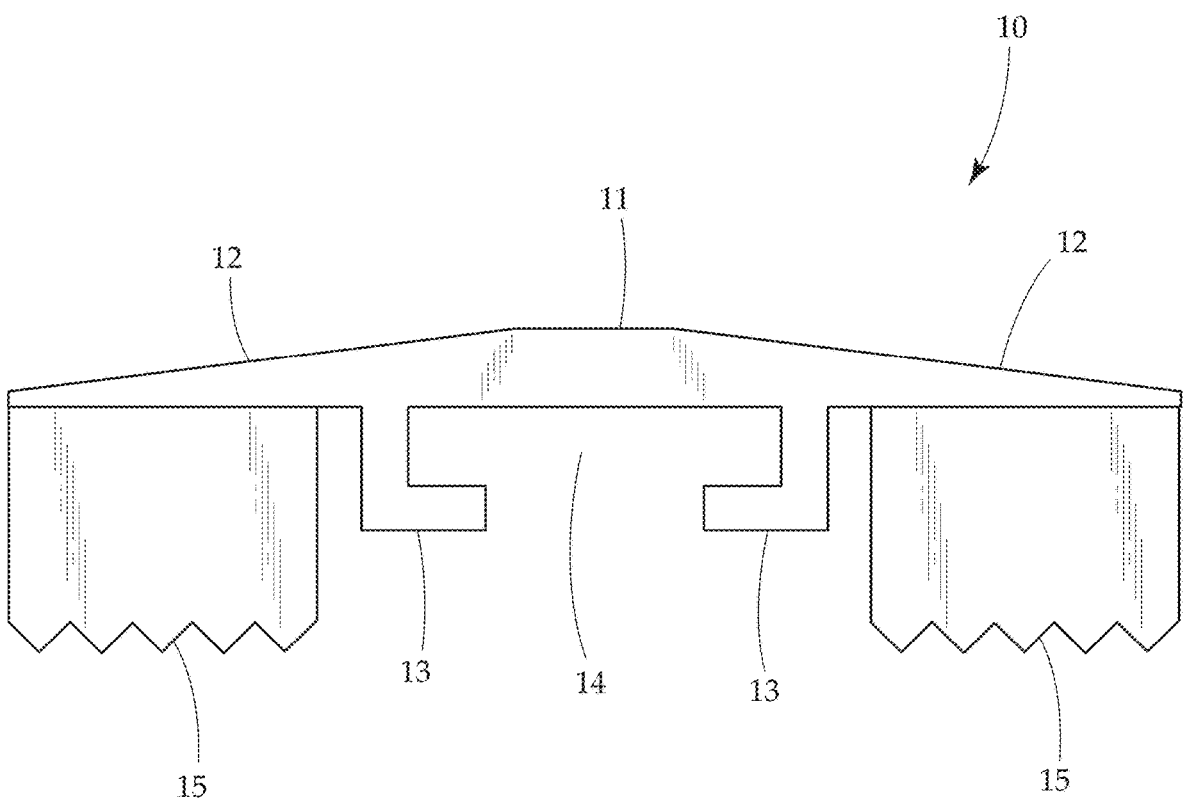
FIG. 1 provides a side cross-sectional view of an embodiment of the present invention.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Solar panel installations are increasingly being constructed to not only absorb energy from the sun, but also to provide shelter from the elements, including rain, wind, snow, and sun. However, due to the modular "panel" construction of solar panels, there are inevitably a number of gaps between each solar panel in the installation. To adequately provide the intended shelter, these gaps must be sealed to prevent infiltration of water and other elements.

Generally, the present disclosure concerns a gap covering, in the form of weather stripping, to cover gaps between solar panels. The weather stripping may be formed generally of an elongate body with two flanges, one flange extending from each lengthwise side of the body. A gasket may extend downward from each flange, and each gasket may be configured to be urged against a top surface of a solar panel, thereby sealing against the solar panel. A bracket may be formed on a bottom part of the elongate body. The bracket may allow connection of a structure such as a bolt head, threaded shaft, or other connector to engage with the bracket and in turn with the weather stripping. On an opposite side of the solar panels, an anchor plate or similar connector may engage with the rear of the solar panel to secure the weather stripping and to urge the gasket against the top of the solar panel, creating a tight, weather resistant fit.

While generally discussed with a clamping type connection of the weather stripping to the solar panels, it should be understood that any connection configuration to hold the weather stripping to the solar panels may be used. This may include connection of the weather stripping to a support structure, adhesion of the weather stripping to the solar panel, weighted or frictional connections, direct connection to one or more solar panels, and the like.

The body, including flanges, may be formed of any material capable of spanning a gap between solar panels and withstanding forces applied to it to tighten a gasket against the solar panels. Typically, the body may be formed of a metal or plastic, but of course may be made of other materials as well. In a particular embodiment, the body may be somewhat flexible such that it is able to bend over another weather stripping piece at a cross point. In many embodiments the body may be formed of an extruded material such as extruded metal or extruded plastic.

The gaskets may be formed of a material which is softer and/or more flexible than the body material and the solar panel material. Typically the gasket is formed of a compressible and/or deformable material. Typical gasket materials include but are not limited to soft plastics, rubber, foam, flexible metals, and the like.

The brackets disclosed herein may be any structure operable to receive a connector, such as a threaded shaft or bolt, a head of a bolt or other connector, a matching bracket connector, and the like. The bracket may have a smooth or threaded slot, among other structures and operates as a structural element to allow connection of the weather stripping body to a component which will hold the weather stripping in place.

Figure 2:
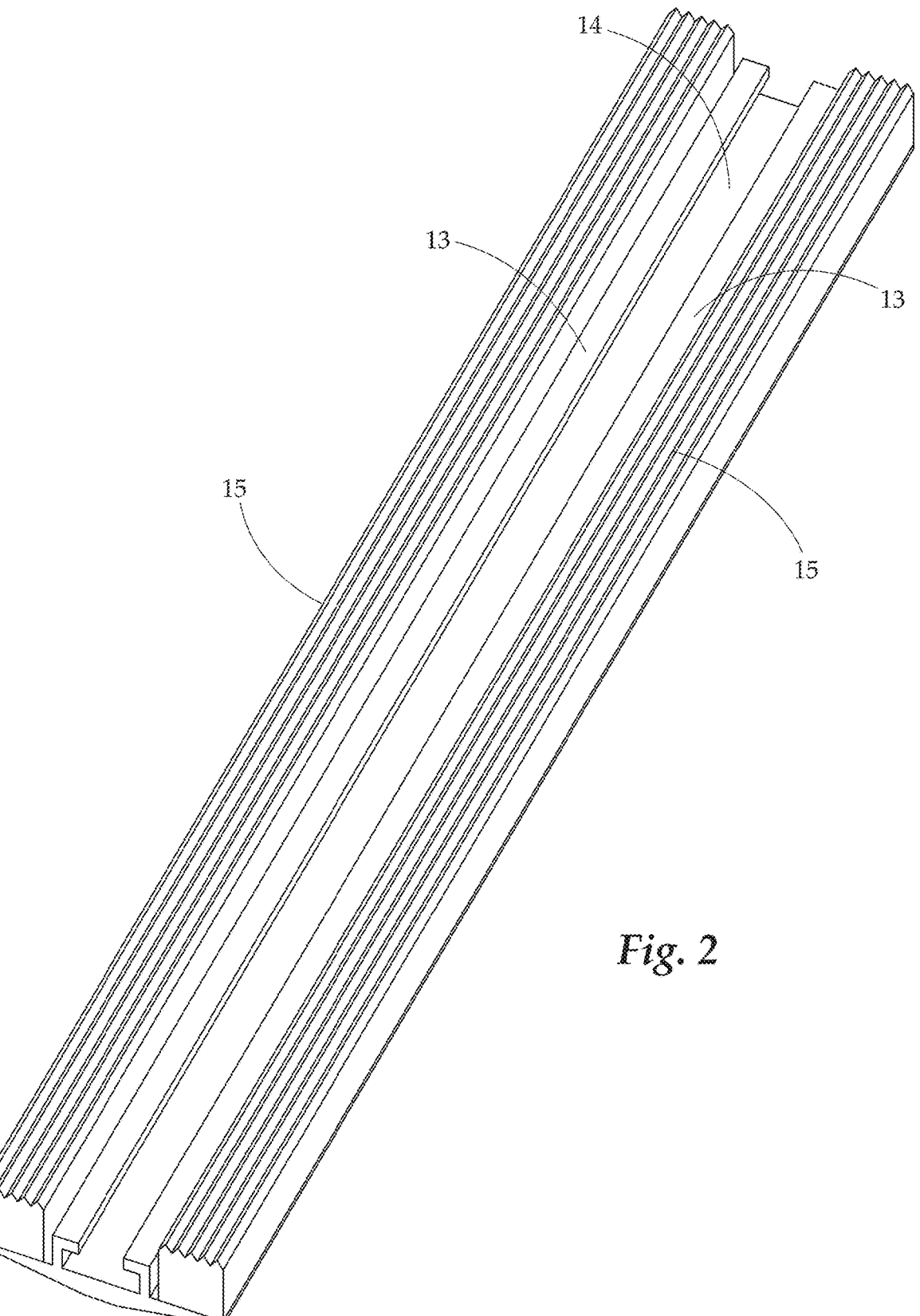
FIG. 2 provides a perspective view of an underside of an embodiment of the present invention.

Turning now to FIGS. 1 and 2, a side view and a bottom perspective view of an embodiment of the present disclosure is provided. The gap cover weather stripping 10 is formed of an elongate body 11. A flange 12 extends outwardly from each side of the elongate body 11. In many embodiments, the flange 12 and body 11 are formed of a unitary piece, but not necessarily. In this embodiment, the top surface each flange 12 tapers at a downward angle towards a bottom surface. A gasket 15 is attached to the bottom surface of each flange 12. In this view, the gasket 15 extends beyond a bottom-most part of the body. The gasket 15 is configured and operable to deform at least slightly when urged against a solar panel. In this view, the gasket 15 has teeth on its bottoms surface which may flatten out upon application of force. The teeth create a higher pressure area due to their small surface area, which aids in creating a tight seal against the solar panel. On a bottom surface of the body 11 is a bracket 13 which allows connection of the weather stripping body 10 to an anchor or other secure connection to hold the weather stripping in place. Here, bracket 13 is shown as two 'L' shaped prongs which together define a 'T' shaped keyed slot 14. Of course, the bracket may be formed of other similar structures without straying from the scope of this invention. The keyed slot 14 in this figure is operable to slideably receive a head of a bolt (not shown in this Figure). The bolt head can move along the length of the keyed slot 14 (into and out of the page as shown) but is limited in a motion away from the bottom of the body 11 by the inwardly extending bracket 13 portions, which engage with and block the head of the bolt.

While not shown in FIGS. 1 and 2, in another embodiment, a bottom surface of the flange may comprise a groove, and the gasket may fit into this grove and be adhered thereto. This may provide a more stable and secure connection point for the gasket.

Figure 3:
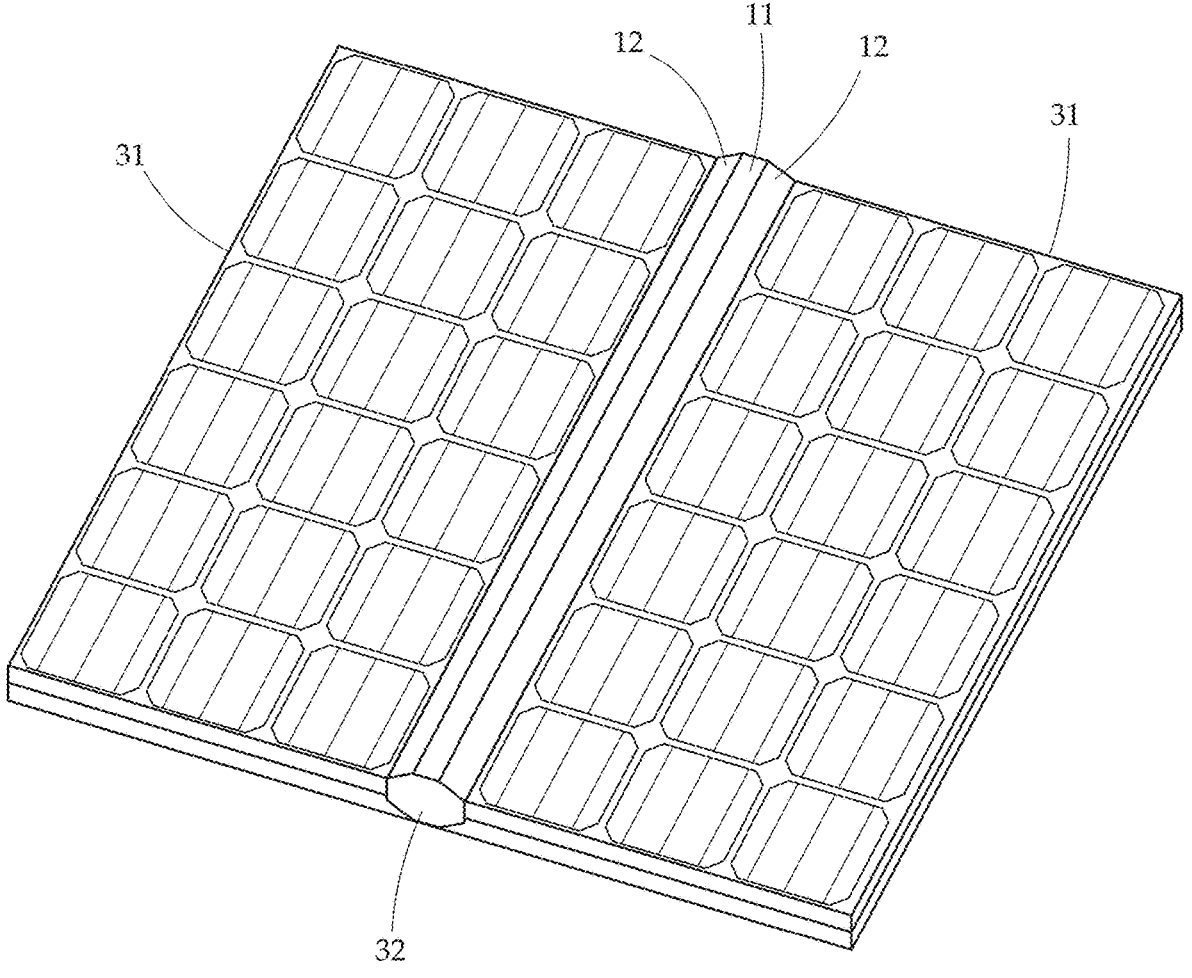
FIG. 3 provides a perspective view of an assembly of the present invention.

FIG. 3 shows another embodiment of the weather stripping gap cover of the present disclosure sealing a gap between two solar panels. Two solar panels 31 are positioned in place though there is a gap between them. Weather stripping body 11 is placed over the gap, with flanges 12 aligned over the top surface of the two adjacent solar panels 31. An end cap 31 covers the end of the gap, preventing weather infiltration from the side.

Figure 4A:
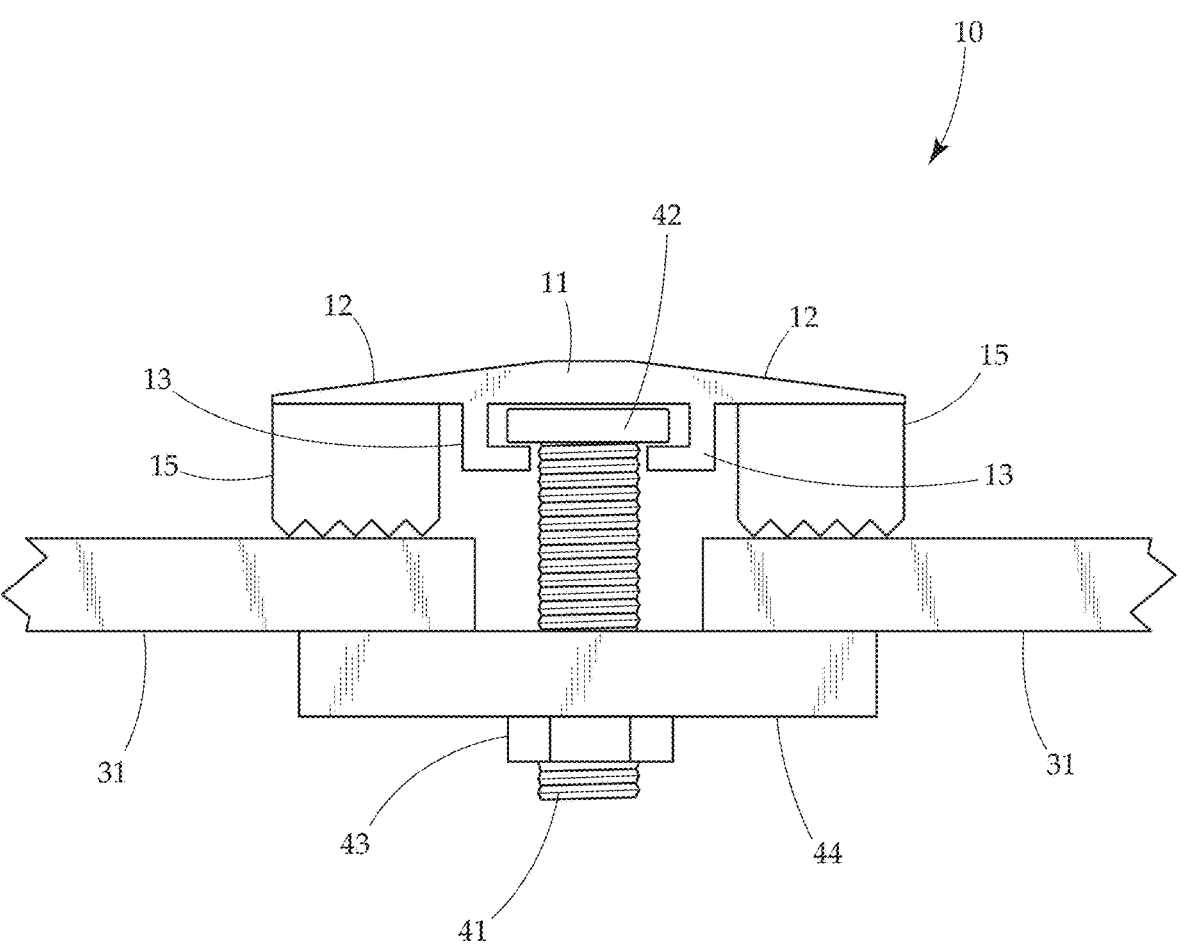
FIG. 4a provides a side cross sectional view of another embodiment of the present invention.

FIG. 4a provides a view of an embodiment of the present disclosure connected to two solar panels and sealing the gap between the two solar panels. In this view, a bolt 41 has a bolt head 42 which is secured in the keyed slot 14. The bolt 41 is limited from moving downward away from the bottom of the body 11 by the bracket 13. Gaskets 15 are positioned just against the top surfaces of the solar panel 31. Upon further tightening of the body against the solar panels 31, in some embodiments the gasket may deform, such that it forms a flat surface against the solar panel. The opposite end of the bolt 41 extends through the gap between the solar panels and engages with an anchor plate 44. The anchor plate 44 is urged against a bottom side of the solar panel 31 and held in place by nut 43 which is engaged with the threads of the bolt 41. Upon a tightening of the nut 43, anchor plate 44 is urged against the bottom of both solar panels 31. This in turn causes bolt head 42 to apply force against bracket 13, drawing body 11 closer to the top of the solar panels 31, and urging gaskets 15 against the solar panels. Once properly tightened, the weather stripping body 11 is held in place due to friction and also covers the gap, substantially limiting if not entirely eliminating infiltration of water, debris, light, and wind through the gap. In another embodiment, the anchor plate 44 may have a threaded inner diameter instead of having a nut. In such an embodiment, the anchor plate 44 may be rotated about the bolt 41 to tighten it against the solar panel.

Figure 4B:
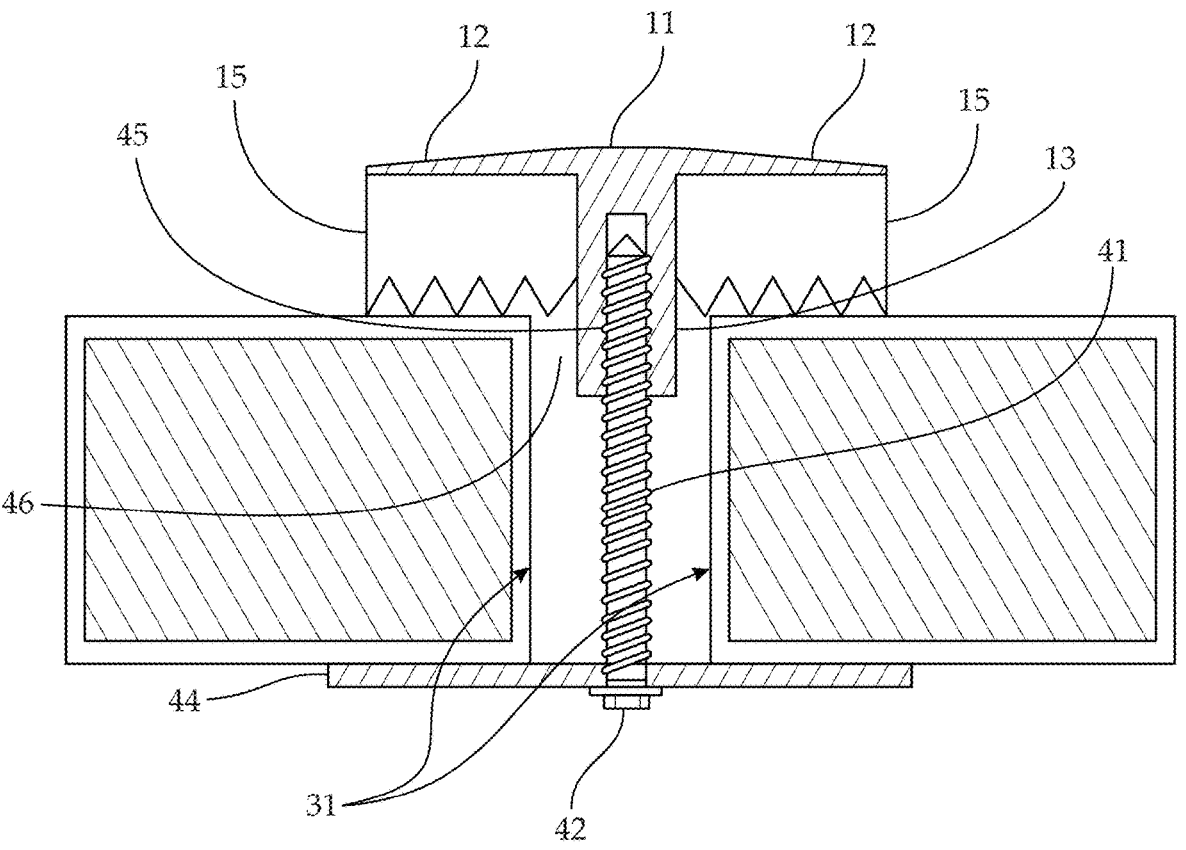
FIG. 4b provides a side cross sectional view of another embodiment of the present invention.

FIG. 4b provides a view of another embodiment of the present disclosure connected to two solar panels and sealing the gap between the two solar panels. In this view, the distal end of the bolt 41 is secured within the 'I' shaped slot 45 of the bracket 13, comprising two planar prongs. The 'I' shaped slot 45 may or may not be internally threaded, and the bolt 41 may or may not be self-tapping, capable of creating internal threading against the flat surface on the interior of the bracket 13. At a certain point, the bolt head 42 is prevented from moving upward toward the bottom of the body 11 by an anchor 44 on the bottom of both solar panels 31. Gaskets 15 are positioned against the top surfaces of the solar panels 31 and over the gap 46 between the solar panels 31 and the bracket 13. As with other illustrated or described embodiments, the gaskets 15 may deform and flatten upon further tightening of the body 11 against the solar panels 31, and, in this embodiment specifically, a portion of the gasket 15 may also protrude into and fill the gap 46 between the solar panels 31 and the bracket 13. A tightening of the bolt 41 via the bolt head 42 against the anchor 44, which is urged against the bottom of the solar panels 31, applies force against the bracket 13, pulling the body 11 closer to the top of the solar panels 31. As with other embodiments, once properly tightened, the weather stripping body 11 is held in place due to friction and also covers the gap, substantially limiting if not entirely eliminating infiltration of water, debris, light, and wind through the gap.

Figure 7:
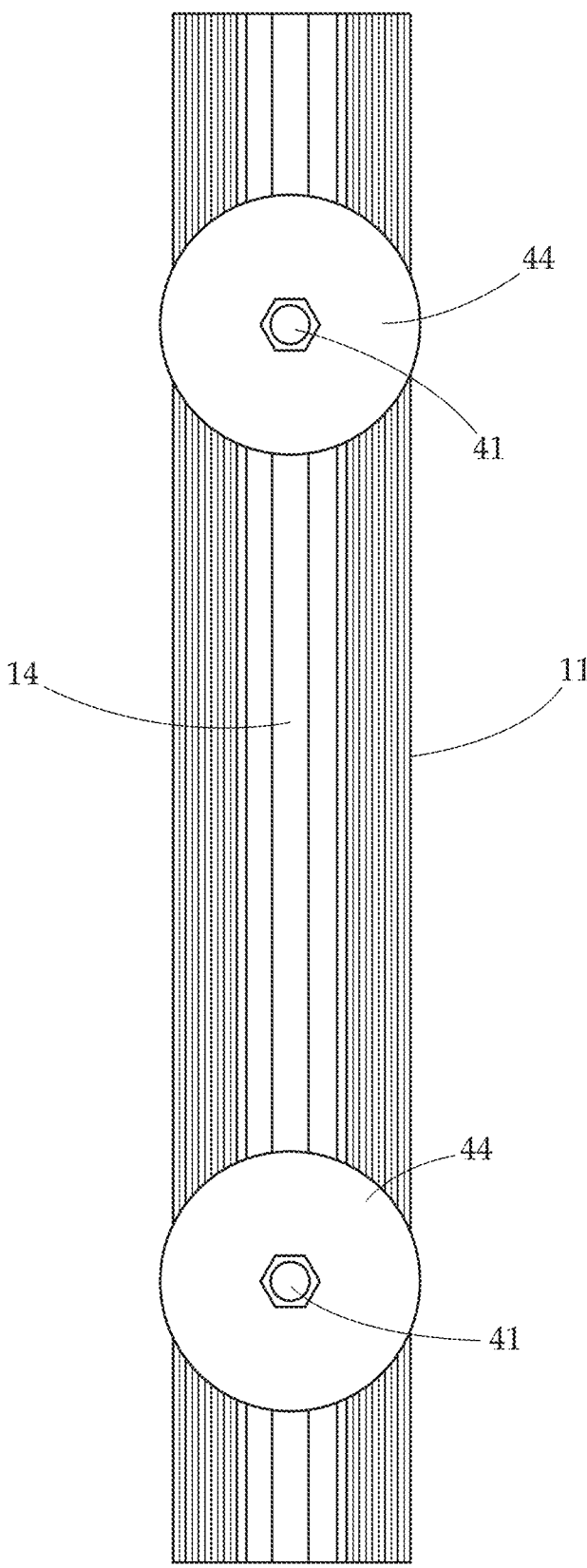
FIG. 7 provides an underside view of an embodiment of an assembly of the present invention.

FIG. 7 provides a bottom view of the weather stripping body 11 connected to the anchor plates 44. In this view, anchor plate is a circular plate, but of course any plate shape may be used. The plate 44 extends wide enough to catch a part of the solar panel which will be sandwiched between the anchor plate 44 and gasket 15. A bolt 41 has a bolt head (not shown) engaged with the keyed slot 14. Nut 43 controls the position of the plate 44 along the length of the bolt 41 and can be tightened to tighten the gaskets 15 against the solar panels, or loosened to remove the weather stripping. In a similar embodiment, the slot may be a threaded connector, and a bolt head may be positioned below the plate 44. Upon a tightening of the bolt head the anchor plate 44 is urged against a bottom of the solar panel by tightening the bolt into the threaded slot bracket of the weather stripping.

Figure 5:
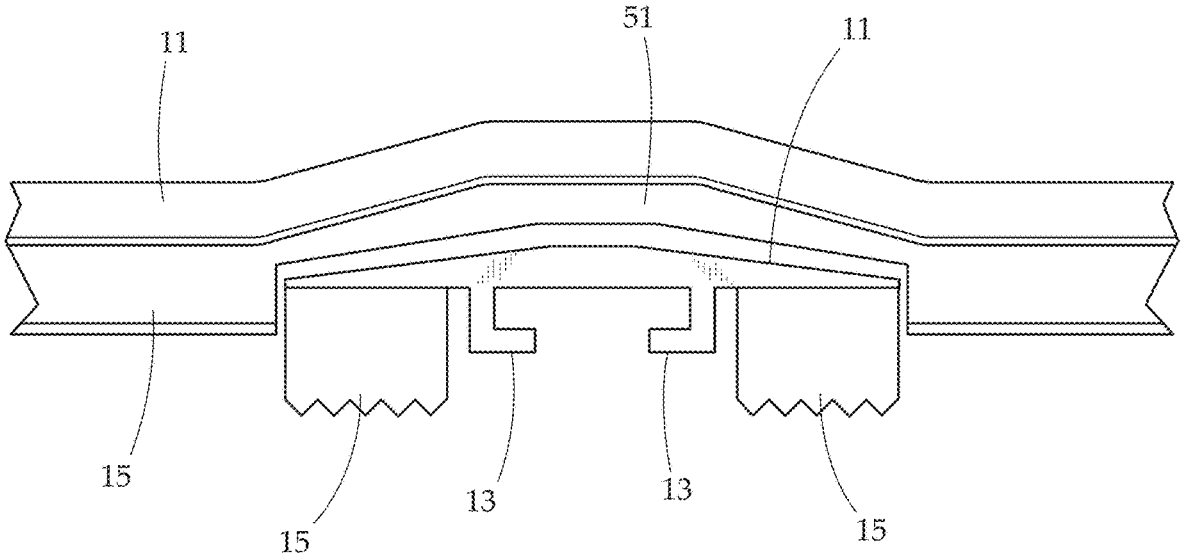
FIG. 5 provides a side cross sectional view of yet another embodiment of the present invention.
Figure 6:
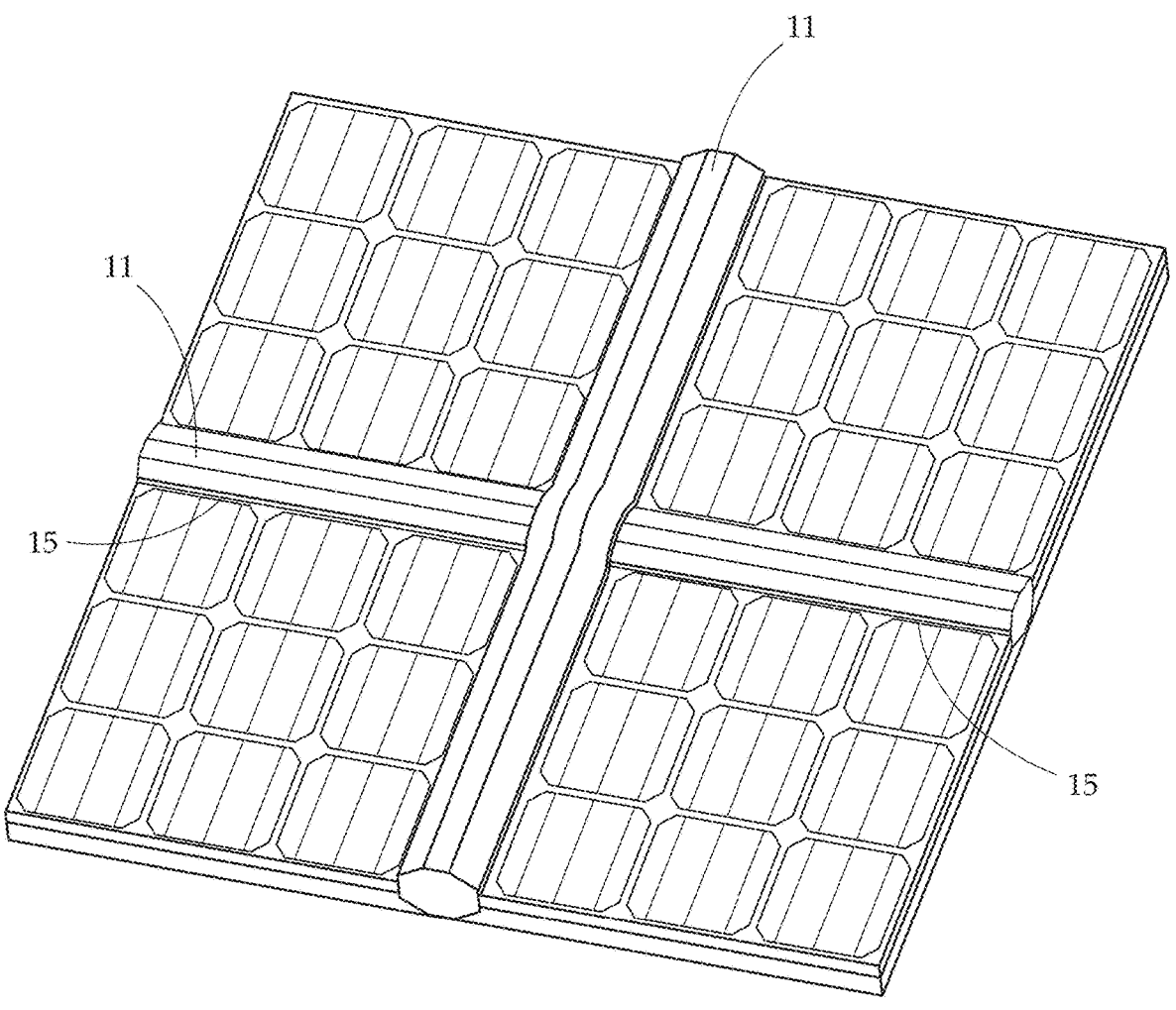
FIG. 6 provides a perspective view of still another embodiment of the present invention.

FIGS. 5 and 6 show a side view of an embodiment of two weather stripping pieces at a crossover point. In solar panel installations, at the corners of four panels there will inevitably a cross over of two gaps. In some embodiments, weather stripping can be cut and abut another perpendicularly crossing weather stripping. However, in such an embodiment, there will be a small opening at the interface, this may be sealed with a caulking, tape, or similar sealant. However, in many other embodiments it may be preferable to have one weather stripping piece go under and one weather stripping piece going over, as seen in FIG. 6. In typical embodiments, two features of the weather stripping may be used, alone or in combination, to achieve one weather stripping being able to extend over the other. First, the weather stripping body 11 material may be formed of a relatively flexible material such as a flexible metal or plastic. Secondly, the gasket 15 of the top weather stripping piece may have a cutout 51 which accommodates for all or at least part of a height of the lower weather stripping body 11. When installed, the cutout 51 gasket will be urged against a top surface of the lower weather stripping body 11 thereby sealing against this top surface to limit or prevent weather infiltration. In the embodiment of FIGS. 5 and 6, both a flexible body 11 and gasket cutout 51 are used. However, in other embodiments, only a flexible body, or only a gasket cutout may be employed to achieve the same goal.

Figure 8:
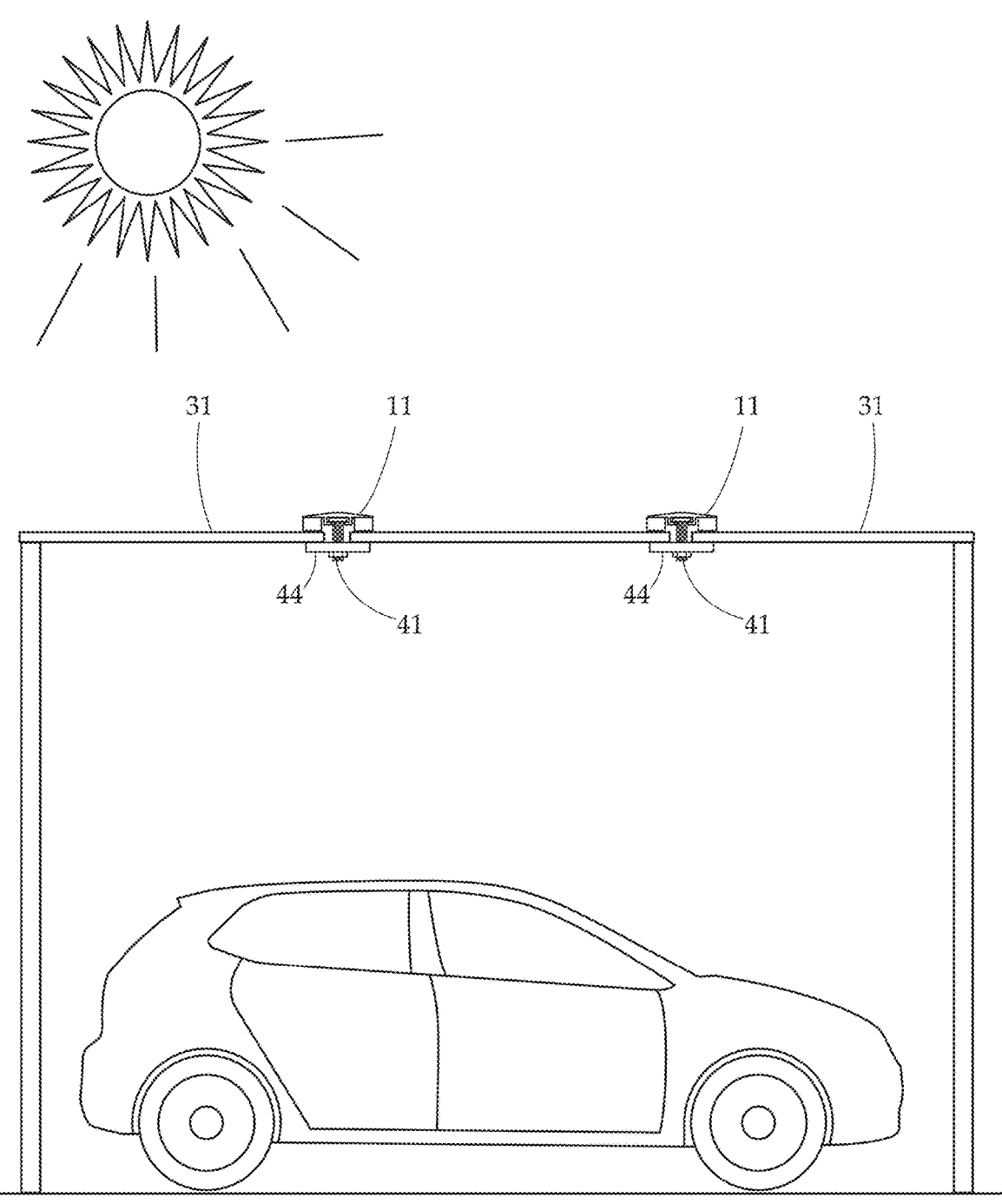
FIG. 8 provides a view of yet another embodiment of the present invention.

FIG. 8 provides a view of the weather strippings of the present disclosure installed on a solar installation which covers a parking lot. A support structure, shown here as uprights hold the solar panels 31 above the ground and provide a supportive framework to hold the solar panels 31. A car is parked underneath the solar panels 31. As can be envisioned, without gap coverings, in a rain storm, water will pass through the gaps onto the car. Further still, much of the water that falls on the entire surface area of the solar installation will be forced through these gaps. Therefore, water flow through the gaps can be very substantial and even dangerous. This is even more evident in an angled configuration. A gap at a bottom of an angled solar panel will receive all or nearly all rain which falls on the entire solar panel and runs off. The gaps between the solar panels in this embodiment are sealed with the weather stripping body which has a bolt head secured in the keyed slot. The distal end of the bolt is secured to the anchor plate by, in this embodiment a nut. When tightened, the anchor plate 44 and gasket 15 sandwich in place to the solar panels 31, with the gaskets forming a weather-resistant seal to the gap between solar panels.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A weather stripping comprising:
    a body and a bracket;
    the bracket having a top and a bottom, wherein the top of the bracket is connected to a bottom area of the body;
    wherein the bracket comprises two L-shaped prongs that define a T-shaped keyed slot;
    wherein the T-shaped keyed slot is defined at a center area of the body;
    wherein the T-shaped keyed slot comprises a widened opening along a length of the body; and
    wherein the body and the bracket, including the two L-shaped prongs, are formed of one material.

2. The weather stripping of claim 1 wherein the body comprises a flange extending away from each lengthwise edge of the body.

3. The weather stripping of claim 2 wherein each flange is also formed of the one material.

4. The weather stripping of claim 2 further comprising a gasket attached to and extending away from a bottom surface of each flange.

5. The weather stripping of claim 4 wherein the gasket extends beyond the bottom of the bracket.

6. The weather stripping of claim 4 wherein a top surface of each flange tapers at a downward angle towards the bottom surface.

7. The weather stripping of claim 6 wherein both the bottom surface and the top surface of each flange extends from each lengthwise edge of the body towards the center of the body.

8. The weather stripping of claim 4 wherein the bottom surface of each flange is flat.

9. The weather stripping of claim 4 wherein the gasket is formed of a compressible or deformable material.

10. The weather stripping of claim 4 wherein the gasket is rubberized.

11. The weather stripping of claim 4 wherein the gasket comprises a plurality of teeth at a bottom surface.

12. The weather stripping of claim 4 wherein the bottom surface of the flange comprises a groove, and the gasket is fitted within the groove.

13. The weather stripping of claim 4 wherein the body is connectable to a plurality of solar panels such that the gasket on one flange engages with a top surface of a first solar panel, and the gasket on the other flange engages with a top surface of a second solar panel.

14. The weather stripping of claim 1 wherein the bracket is connectable to an anchor.

15. The weather stripping of claim 1 wherein the bracket is a threaded opening operable to receive a threaded connector.

16. The weather stripping of claim 1 wherein the bottom of the bracket is a bottom-most part of the body.

17. The weather stripping of claim 1 wherein the T-shaped keyed slot is configured to slideably receive a head of a bolt.

18. The weather stripping of claim 1 wherein the T-shaped keyed slot is smooth.

19. The weather stripping of claim 1 wherein the T-shaped keyed slot extends along a length of the body.

20. A weather stripping comprising:
    a body and a bracket;

the bracket having a top and a bottom, wherein the top of the bracket is connected to a bottom area of the body;

wherein the bracket comprises two planar prongs that define an I-shaped slot;

wherein the I-shaped slot is defined at a center area of the body;

wherein the I-shaped slot comprises a narrow opening along a length of the body; and wherein the body and the bracket, including the two planar prongs, are formed of one material.

\* \* \* \* \*